(12) United States Patent
Nakajima et al.

(10) Patent No.: US 11,270,085 B2
(45) Date of Patent: Mar. 8, 2022

(54) GENERATING METHOD, GENERATING DEVICE, AND RECORDING MEDIUM

(71) Applicant: FUJITSU LIMITED, Kawasaki (JP)

(72) Inventors: Takuya Nakajima, Machida (JP); Ryuichi Takagi, Nakano (JP); Masashi Kimura, Setagaya (JP); Takamichi Toda, Kawasaki (JP); Takuya Yoshida, Kawasaki (JP); Kayoko Iwamoto, Kawasaki (JP); Naoki Takahashi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 46 days.

(21) Appl. No.: 16/153,862

(22) Filed: Oct. 8, 2018

(65) Prior Publication Data
US 2019/0129948 A1   May 2, 2019

(30) Foreign Application Priority Data

Oct. 30, 2017   (JP) .............................. JP2017-209840

(51) Int. Cl.
*G06N 5/04* (2006.01)
*G06N 3/08* (2006.01)
(Continued)

(52) U.S. Cl.
CPC ............ *G06F 40/58* (2020.01); *G06F 40/242* (2020.01); *G06F 40/268* (2020.01); *G06F 40/42* (2020.01); *G06N 3/084* (2013.01); *G06N 5/046* (2013.01)

(58) Field of Classification Search
CPC .......... G06F 40/58; G06F 40/30; G06F 40/47; G06F 40/51; G06F 40/242; G06F 40/40; G06F 40/55; G06F 40/205; G06F 40/211; G06F 40/253; G06F 40/289; G06F 3/0237; G06F 40/263; G06F 40/268;
(Continued)

(56) References Cited

U.S. PATENT DOCUMENTS 7,366,654 B2 *   4/2008   Moore .................... G06F 40/40
                                                     704/2
2003/0061023 A1 *   3/2003   Menezes ................ G06F 40/45
                                                     704/4
(Continued)

FOREIGN PATENT DOCUMENTS

| JP | 2004-355217 | 12/2004 |
| JP | 2006-190226 |  7/2006 |
| JP | 2015-228170 | 12/2015 |

OTHER PUBLICATIONS

Mikolov et al, Efficient Estimation of Word Representation in Vector Space, https://arxiv.org/abs/1301.3781, pp. 1-12, Sep. 7, 2013 (Year: 2013).*
(Continued)

*Primary Examiner* — Linda Wong
(74) *Attorney, Agent, or Firm* — Fujitsu Patent Center

(57) ABSTRACT

A non-transitory computer-readable recording medium stores therein a generating program that causes a computer to execute a process including: receiving a word; generating a first and a second vectors according to the received word by applying a first and a second conversion parameters each to the received word; and generating a new third vector according to the word based on the generated first and second vectors.

13 Claims, 14 Drawing Sheets

(51) Int. Cl.
  *G06F 40/42* (2020.01)
  *G06F 40/242* (2020.01)
  *G06F 40/268* (2020.01)
  *G06F 40/58* (2020.01)

(58) Field of Classification Search
  CPC .............. G06F 40/284; G06F 16/3329; G06F 16/3344; G06F 16/90344; G06F 40/20; G06F 40/216; G06F 40/237; G06F 40/247; G06F 16/374; G06F 40/42; G10L 15/26; G10L 13/00; G10L 15/005; G06N 3/084; G06N 5/046
  See application file for complete search history.

(56) References Cited

U.S. PATENT DOCUMENTS

| | | | |
|---|---|---|---|
| 2014/0236577 A1 | 8/2014 | Malon et al. | |
| 2017/0199867 A1* | 7/2017 | Koji | G06F 40/284 |
| 2017/0308526 A1* | 10/2017 | Uchiyama | G06F 40/211 |
| 2017/0344530 A1* | 11/2017 | Krasadakis | G06F 40/47 |
| 2018/0018317 A1* | 1/2018 | Cheng | G06F 40/242 |
| 2020/0036659 A1* | 1/2020 | Wu | G06N 5/02 |

OTHER PUBLICATIONS

JPOA—Office Action dated Jul. 6, 2021 for Japanese Patent Application No. 2017-209840, with machine English translation.
Ghannay et al., "Word Embeddings Evaluation and Combination", Proceedings of LREC2016, European Language Resources Association (ELRA), pp. 300-305, URL: https://www.aclweb.org/anthology/L16-1046, pp. 300-305. cited in JP-OA dated Jul. 6, 2021 for corresponding Japanese Application No. 2017-209840.
Tsuchida et al., "Semantic operations of areas and landmarks using Word2Vec", IEICE Data Engineering Technical Group, Database Society of Japan, Information Processing Society of Japan, Database Management System, DEIM Forum 2016 H5-1, pp. 1-6. cited in JP-OA dated Jul. 6, 2021 for corresponding Japanese Application No. 2017-209840.
Maki et al., "Visual Axis Information Introduction of word dispersion expressions to the used predicate structure analysis model", Proceedings of the Twenty-third Annual Meeting of the Association for Natural Language Processing, Japan, Language Processing Society, pp. 605-608. cited in JP-OA dated Jul. 6, 2021 for corresponding Japanese Application No. 2017-209840.
JPOA—Japanese Office Action dated Jan. 11, 2022 for Japanese Patent Application No. 2017-209840, with English translation. ** Reference Nos. 1-4 cite in the JPOA were previously submitted in the IDS filed on Aug. 31, 2021.

* cited by examiner

FIG.3

| WORD | VECTOR |
|---|---|
| PC | [0.83, 0.62, 0.49, ...] |
| SMARTPHONE | [0.68, 0.94, 0.51, ...] |
| NOTEBOOK PC | [0.95, 0.34, 0.77, ...] |
| TABLET | [0.05, 0.64, 0.64, ...] |
| ... | |

| ID | VECTOR |
|---|---|
| A-001 | [0.56, 0.94, 0.22, ...] |
| A-002 | [0.31, 0.58, 0.16, ...] |
| ... | |
| B-001 | [0.69, 0.34, 0.95, ...] |
| ... | |

122

| ID | TITLE | ANSWER |
|---|---|---|
| A-001 | EVEN WHEN PRESSING POWER BUTTON, PC IS NOT ACTIVATED. | COPING METHOD IS ⋯ |
| A-002 | ⋯ | |
| ⋯ | | |
| B-001 | | |
| ⋯ | | |

123

GENERATING METHOD, GENERATING DEVICE, AND RECORDING MEDIUM

CROSS-REFERENCE TO RELATED APPLICATION

This application is based upon and claims the benefit of priority of the prior Japanese Patent Application No. 2017-209840, filed on Oct. 30, 2017, the entire contents of which are incorporated herein by reference.

FIELD

The embodiments discussed herein are related to a generating method, a generating device, and a recording medium.

BACKGROUND

In language processing, a technique that uses a plurality of corpuses together is known. For example, in machine translation, known is a technique for improving quality of translation results and shortening a translation response time by using a plurality of corpuses together. The technique uses a plurality of translation dictionaries that store phrases belonging to a first language and phrases belonging to a second language in association with each other. The technique accepts reference information including one or more phrases and compares the translation dictionaries with the reference information to obtain similarity of each translation dictionary to the reference information. The technique defines priorities for searching each translation dictionary based on the similarity. In addition, in the technique, a corpus which is a collection of sentences may be specified instead of a dictionary.

Patent Document 1: Japanese Laid-open Patent Publication No. 2004-355217

SUMMARY

According to an aspect of the embodiment, a non-transitory computer-readable recording medium stores therein a generating program that causes a computer to execute a process including: receiving a word; generating a first and a second vectors according to the received word by applying a first and a second conversion parameters each to the received word; and generating a new third vector according to the word based on the generated first and second vectors.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram illustrating an example of a corpus model according to the first embodiment;

FIG. 4 is a diagram illustrating an example of a search-time learning model according to the first embodiment;

DESCRIPTION OF EMBODIMENTS

In the technique, there arises a problem of losing features of any of the corpuses. For example, when a sentence is segmented through a morphological analysis using a database that stores a plurality of sentences such as FAQs to generate a word vector through machine learning, a conversion parameter that is generated from a corpus and that converts a word into a vector is used. In this case, for example, when a conversion parameter generated from one corpus is selected, features of unselected corpuses are not reflected in a search result. Meanwhile, when a conversion parameter is generated using a corpus integrating two corpuses, features included in each corpus before integration may be lost.

Preferred embodiments will be explained with reference to accompanying drawings. This invention is not limited by these embodiments. Further, each of the following embodiments may be appropriately combined without causing contradiction.

[a] First Embodiment

A generating device 10 described later according to a first embodiment causes a computer to execute answer extracting processing using word vectors generated using corpus models. The answer extracting processing according to the first embodiment is processing for extracting an appropriate answer to an input question sentence with reference to, for example, frequently asked questions (FAQs) of a call center. The generating device 10 is an example of a computer device such as a server, a personal computer, and a tablet. A corpus model is an example of a conversion parameter.

Figure 1:
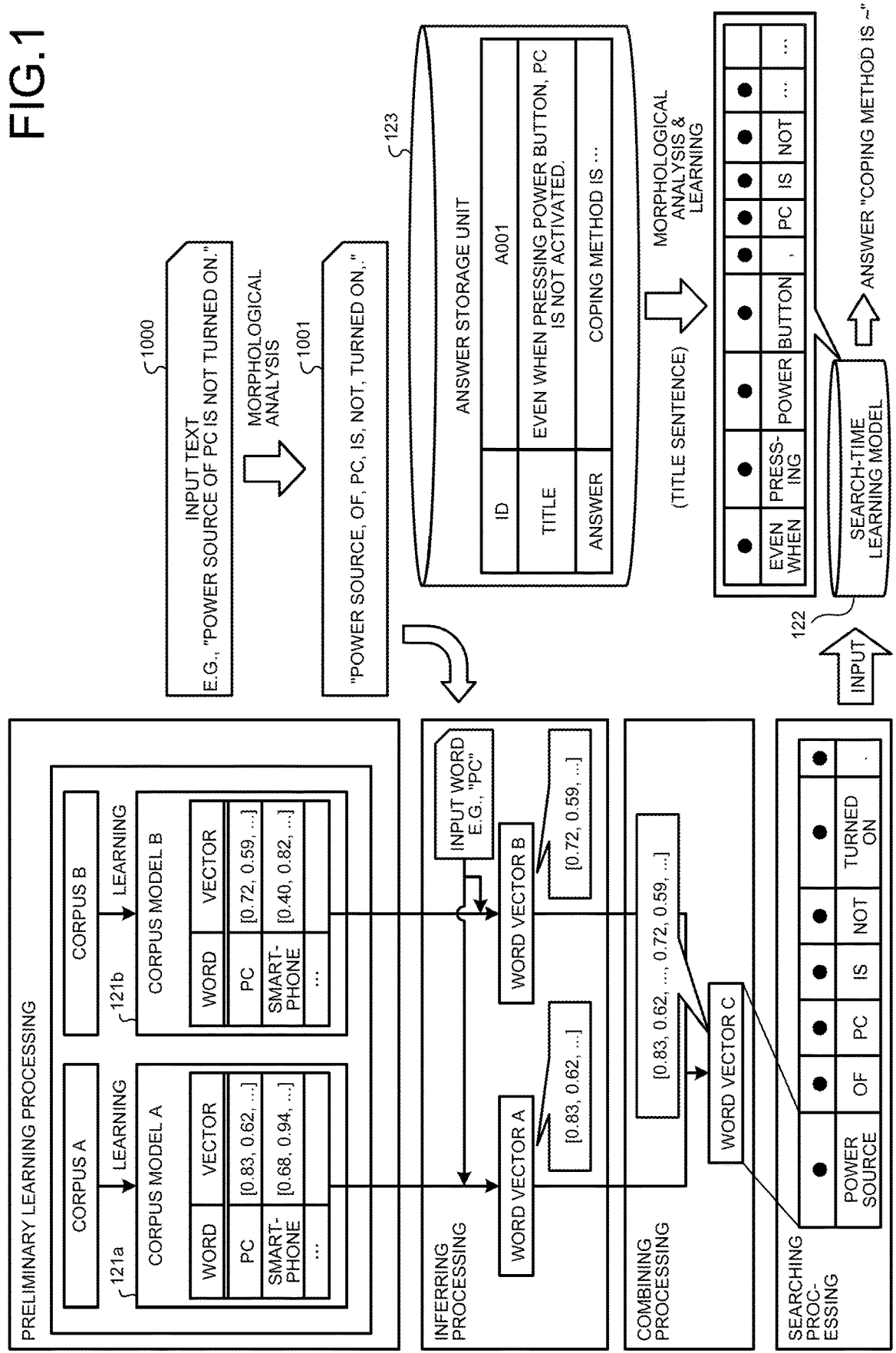
FIG. 1 is a diagram illustrating an example of answer extracting processing according to a first embodiment.

The answer extracting processing according to the first embodiment will be described below with reference to FIG. 1. FIG. 1 is a diagram illustrating an example of the answer extracting processing according to the first embodiment. As illustrated in FIG. 1, in the answer extracting processing according to the first embodiment, by learning corpuses in preliminary learning processing, a corpus model A 121a and a corpus model B 121*b* described later are generated. Hereinafter, the corpus model A 121*a* and the corpus model B 121*b* may be represented as a corpus model 121 when expressed without distinction.

Each corpus according to the first embodiment is a collection of a plurality of sentences and a group of texts obtained from external servers such as encyclopedia sites, newspaper databases, and search engines. The corpuses according to the first embodiment may be internal information of a company or the like that uses the generating device 10, such as a customer database or a question-answer log of a call center. In the first embodiment, for example, a corpus A is an encyclopedia site, and a corpus B is internal information.

The corpus model 121 according to the first embodiment is generated by, for example, segmenting sentence groups included in the corpus into words through a morphological analysis and learning word vectors (bag of words) in distributed representation for the segmented word groups. A distributed representation of a word is a multidimensional vector in which each word is represented by a quantified continuous value with respect to a plurality of dimensions which is each feature element among words. The distributed representation of words can be learned by a publicly known technique such as Word 2 Vec, and thus, detailed description will be omitted.

The corpus model 121 can be obtained by inputting, for example, teacher data that associate a word vector with a correct answer label into a neural network or the like, learning a relationship between the input vector and the correct answer label, and generating a learned model.

Next, in inferring processing, the generating device 10 first receives an input of a text such as a question sentence. As illustrated in FIG. 1, the generating device 10 receives an input text 1000, for example, "power source of PC is not turned on". Next, the generating device 10 performs the morphological analysis on the input text and segments the input text 1000 into a word group 1001 such as "power source, of, PC, is, not, turned on".

Then, the generating device 10 inputs each segmented word into the pre-generated corpus model 121 to obtain word vectors. The generating device 10 obtains a word vector A by inputting, for example, an input word "PC" into the corpus model A 121*a*. Similarly, the generating device 10 obtains a word vector B by inputting the input word "PC" into the corpus model B 121*b*. As illustrated in FIG. 1, since the corpus model A 121*a* and the corpus model B 121*b* are obtained from different corpuses, the obtained word vectors A and B are also different from each other. The word vectors are examples of a first and a second vectors.

Next, the generating device 10 combines the obtained word vectors A and B. The generating device 10 generates a word vector C by, for example, connecting the word vector B to the word vector A. Likewise, the generating device 10 obtains a distributed representation corresponding to the input text "power source of PC is not turned on" by repeating the inferring processing and the combining processing for other segmented input words as well. The word vector C is an example of a third vector.

On the other hand, the generating device 10 has a search-time learning model 122 described later, which is obtained by processing similar to the preliminary learning processing for answer data to be searched for using the input text. As illustrated in FIG. 1, the search-time learning model 122 is obtained by segmenting titles stored in an answer storage unit 123 described later through the morphological analysis and learning word vectors for segmented word groups.

In searching processing, the generating device 10 obtains an answer corresponding to the input text by inputting the distributed representation corresponding to the input text into the search-time learning model 122. For example, the generating device 10 refers to the answer storage unit 123 and obtains an answer "coping method is ~" corresponding to a title "PC is not activated even when pressing a power button". Then, the generating device 10 outputs the obtained answer.

Thus, since the generating device 10 generates the third vector generated using the first vector generated from the first model and the second vector generated from the second model for the input word, machine learning can be carried out with vectors that retain features of each model.

Function Block

Figure 2:
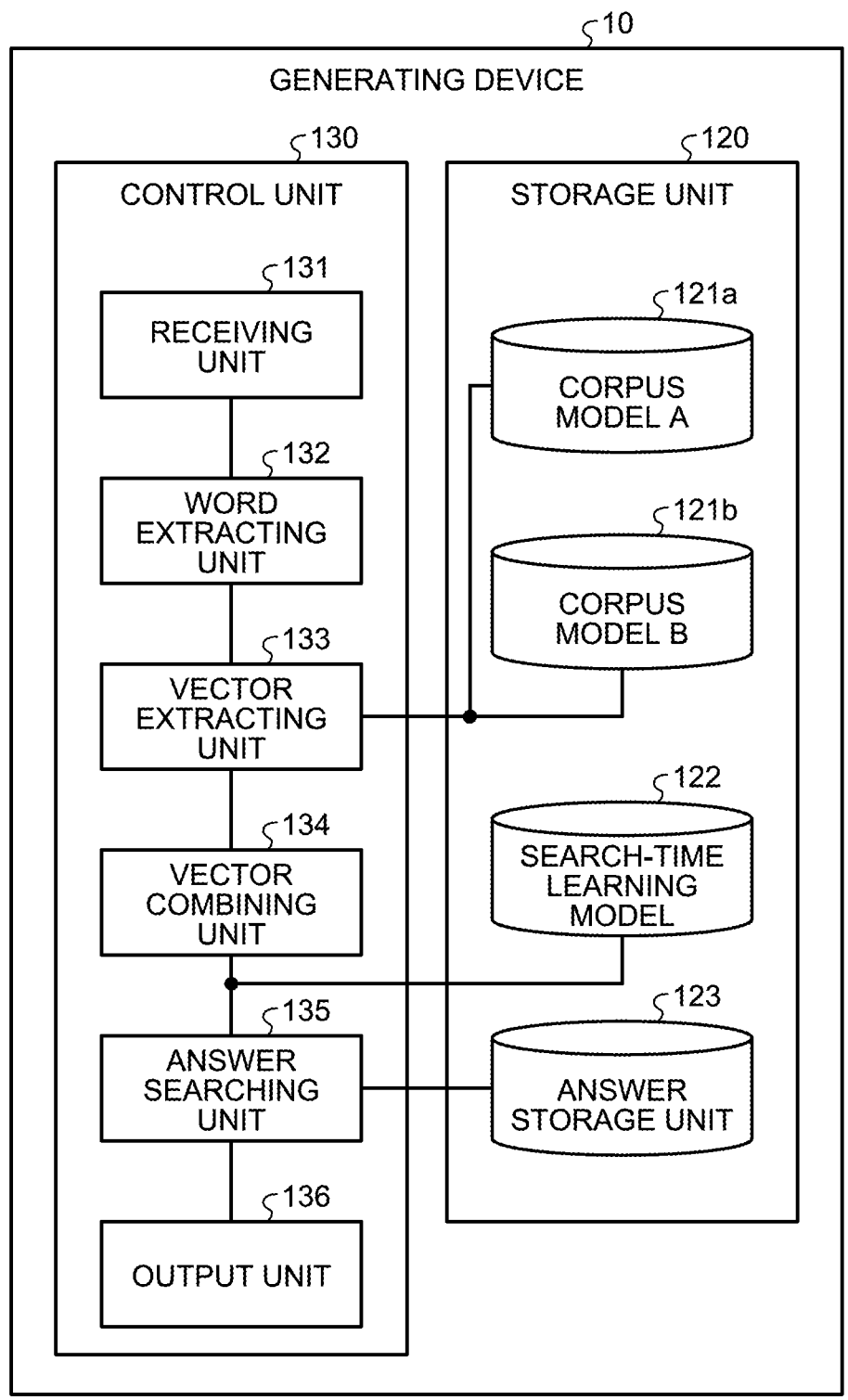
FIG. 2 is a diagram illustrating an example of a generating device according to the first embodiment.

Next, an example of the generating device 10 according to the present embodiment will be described below with reference to FIG. 2. FIG. 2 is a diagram illustrating an example of a generating device according to the first embodiment. As illustrated in FIG. 2, the generating device 10 according to the present embodiment has a storage unit 120 and a control unit 130.

The storage unit 120 is an example of a storage device that stores programs and data and is, for example, a memory or a processor. This storage unit 120 stores the corpus model A 121*a* and the corpus model B 121*b*, the search-time learning model 122, and the answer storage unit 123.

The corpus model A 121*a* and the corpus model B 121*b* according to the first embodiment are dictionaries where words generated from corpuses are associated with word vectors in distributed representation. FIG. 3 is a diagram illustrating an example of a corpus model according to the first embodiment. As illustrated in FIG. 3, the corpus model A 121*a* according to the first embodiment stores "word" and "vector" in association with each other. Since the corpus model B 121*b* has a configuration similar to one of the corpus model A 121*a*, a detailed description will be omitted.

The search-time learning model 122 is a learning model obtained by segmenting titles included in answer data through the morphological analysis and learning word vectors with respect to the segmented word groups. FIG. 4 is a diagram illustrating an example of a search-time learning model according to the first embodiment. As illustrated in FIG. 4, the search-time learning model 122 stores "ID" and "vector" in association with each other.

In FIG. 4, the "ID" stores an identifier that uniquely identifies answer data. The "Vector" stores word vectors in distributed representation obtained from the answer data of the ID.

Figures 5, 6:
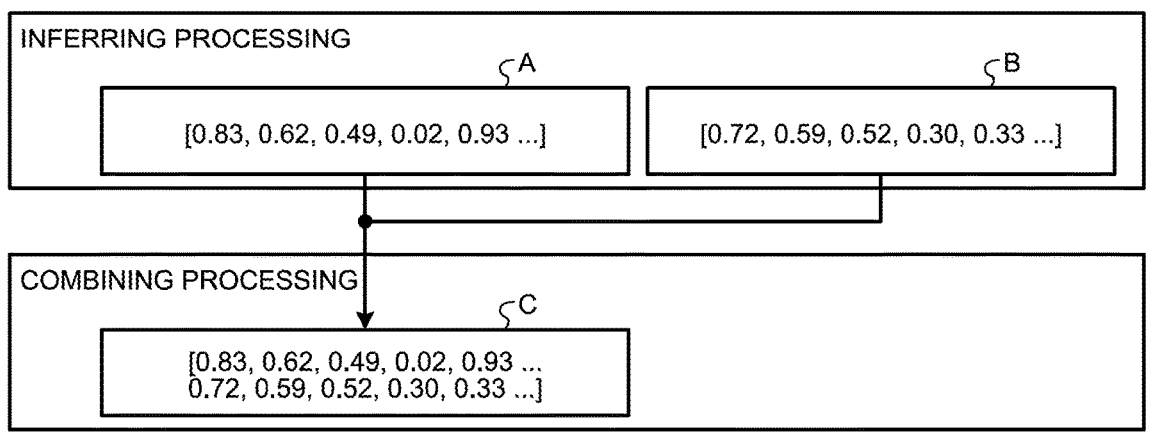
FIG. 5 is a diagram illustrating an example of an answer storage unit according to the first embodiment.
FIG. 6 is a diagram illustrating an example of vector combining processing according to the first embodiment.

As illustrated in FIG. 1, the answer storage unit 123 stores information pre-obtained from, for example, other servers (not illustrated). FIG. 5 is a diagram illustrating an example of an answer storage unit according to the first embodiment. As illustrated in FIG. 5, the answer storage unit 123 stores "title" and "answer" in association with "ID".

In FIG. 5, the "title" stores question sentences corresponding to answer data. The "answer" stores bodies of answer data.

Referring back to FIG. 2, the control unit 130 is a processing unit that controls the entire generating device 10 and is a processor, for example. The control unit 130 includes a receiving unit 131, a word extracting unit 132, a vector extracting unit 133, a vector combining unit 134, an answer searching unit 135, and an output unit 136. The receiving unit 131, the word extracting unit 132, the vector extracting unit 133, the vector combining unit 134, the answer searching unit 135, and the output unit 136 are an example of an electronic circuit included in a processor and an example of a process executed by a processor.

The receiving unit 131 receives an input text to output to the word extracting unit 132. The receiving unit 131 receives an input text from a user through, for example, an operating unit (not illustrated) of the generating device 10. The receiving unit 131 may also receive an input text from a terminal operated by a user through, for example, a communication unit (not illustrated) of the generating device 10.

The word extracting unit 132 performs the morphological analysis on an input text. Upon receiving the output of the input text from the receiving unit 131, the word extracting unit 132 segments the input text into word groups as illustrated in FIG. 1 through the morphological analysis. The word extracting unit 132 outputs the segmented word groups to the vector extracting unit 133. The word extracting unit 132 may segment the input text into word groups by other methods than the morphological analysis.

The vector extracting unit 133 extracts a plurality of word vectors corresponding to the segmented word groups for each corpus model 121 to output to the vector combining unit 134. The vector extracting unit 133 is an example of a first vector processing unit.

The vector extracting unit 133 extracts the word vector A by inputting words into the corpus model A 121a. Similarly, the vector extracting unit 133 extracts the word vector B by inputting words into the corpus model B 121b.

The vector combining unit 134 combines the vectors output from the vector extracting unit 133. The vector combining unit 134 generates a combined word vector C by, for example, connecting the word vector B to the word vector A. The vector combining unit 134 is an example of a second vector processing unit.

FIG. 6 is a diagram illustrating an example of vector combining processing according to the first embodiment. As illustrated in FIG. 6, the vector combining unit 134 generates the word vector C by connecting each element of the word vector B after each element of the word vector A. In this case, for example, when the word vectors A and B are each 100-dimensional vectors, the word vector C is a 200-dimensional vector.

Flow of Processing

Figure 7:
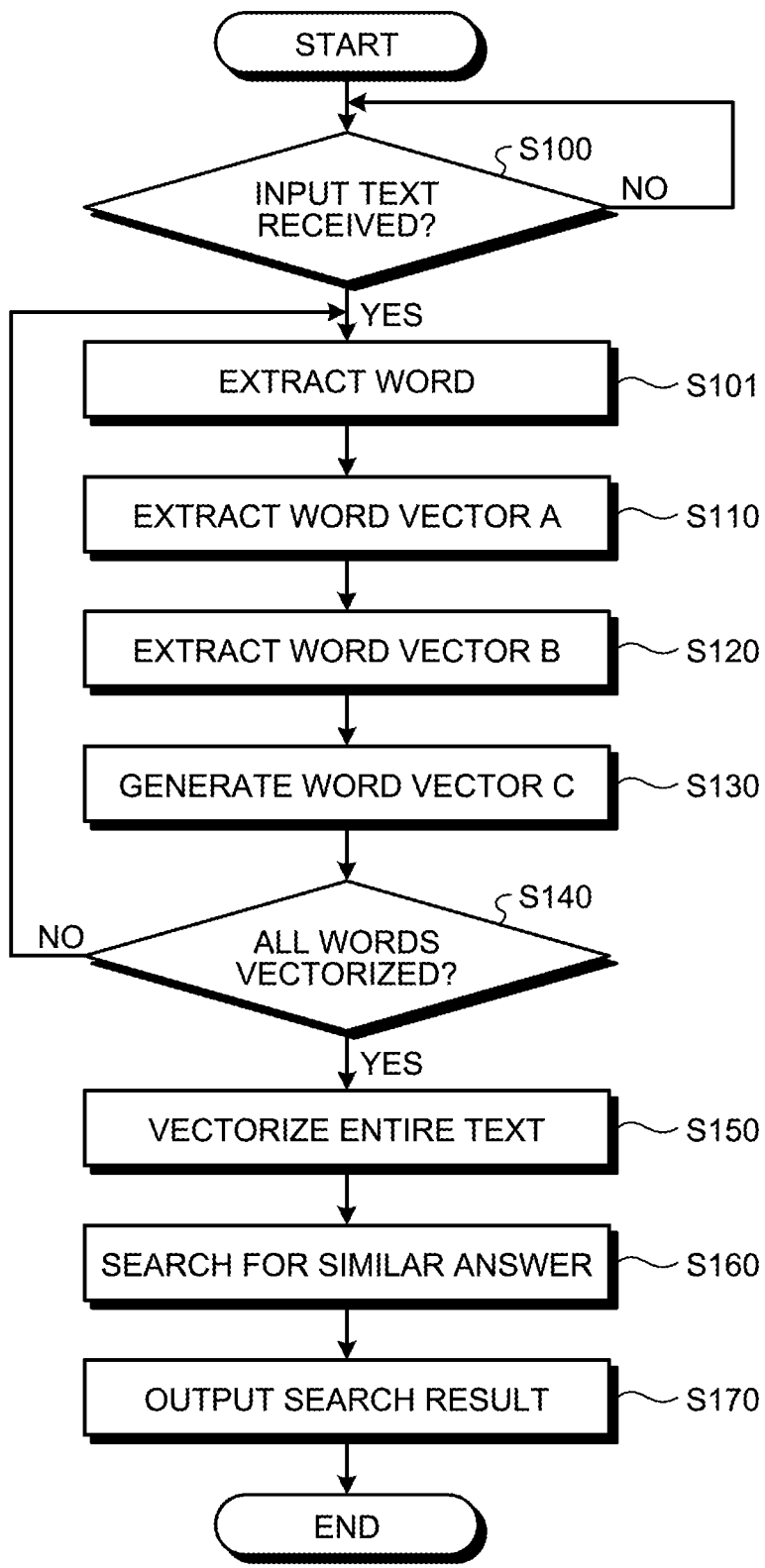
FIG. 7 is a flowchart illustrating an example of answer extracting processing according to the first embodiment.

Next, processing according to the present embodiment will be described below with reference to FIG. 7. FIG. 7 is a flowchart illustrating an example of the answer extracting processing according to the first embodiment. As illustrated in FIG. 7, the receiving unit 131 of the generating device 10 waits until receiving an input text from a user (not illustrated) (S100: No). When determining that an input text is received (S100: Yes), the receiving unit 131 outputs the input text to the word extracting unit 132.

The word extracting unit 132 segments the output input text into words through the morphological analysis. Then, the word extracting unit 132 extracts the segmented words to output to the vector extracting unit 133 (S101).

The vector extracting unit 133 extracts the word vector A by inputting the words into the corpus model A 121a (S110). Similarly, the vector extracting unit 133 extracts the word vector B by inputting the words into the corpus model B 121b (S120). Then, the vector extracting unit 133 outputs the extracted word vectors A and B to the vector combining unit 134.

The vector combining unit 134 combines the output word vectors A and B to generate the word vector C (S130). Then, the vector combining unit 134 determines whether vectorization is completed for all the words segmented from the input text (S140).

When determining that the vectorization is not completed (S140: No), the vector combining unit 134 returns to S101 and repeats the processing. On the other hand, when determining that the vectorization is completed (S140: Yes), the vector combining unit 134 combines the word vectors C generated for each word and vectorizes the entire input text (S150) to output to the answer searching unit 135.

The answer searching unit 135 searches for an answer similar to the input text (S160) by inputting the output vector of the entire input text into the search-time learning model 122 and outputs a search result to the output unit 136. Then, the output unit 136 outputs the output search result through the communication unit or a display unit (not illustrated) (S170).

Effects

As described above, the generating program according to the present embodiment causes a computer to execute processing for receiving a word and applying a first and a second conversion parameters each to the word to generate the first and the second vectors according to the word. The generating program causes a computer to execute processing for generating a new third vector according to the word based on the generated first and second vectors. As a result, features included in the conversion parameters can be retained.

Further, the generating program may cause a computer to execute processing for obtaining, by using a learning model that has performed learning on features of words or phrases included in a plurality of sentences to be determined, determination results of the received word and the sentences to be determined from the third vector. This makes it possible in sentence searching processing to reflect the features included in the conversion parameters in the search result.

Figure 8:
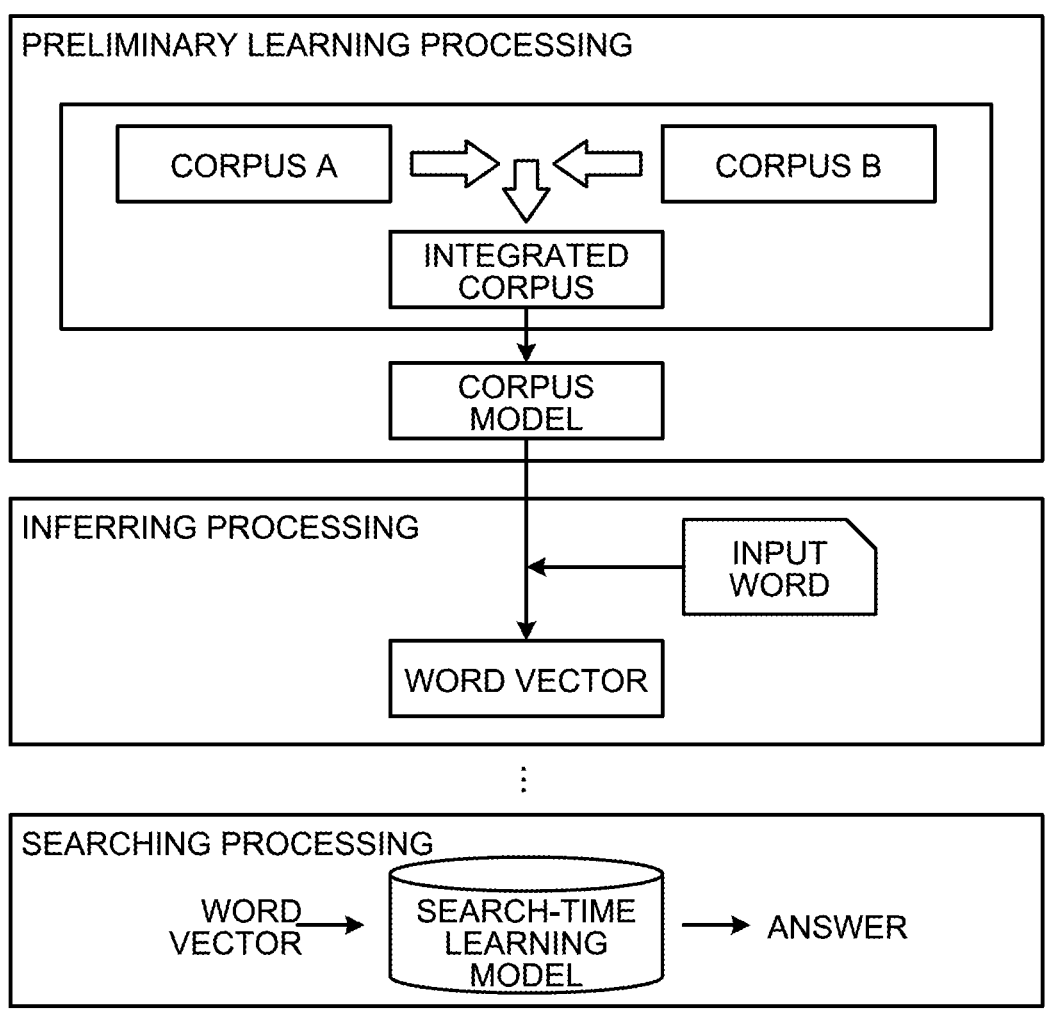
FIG. 8 is a diagram illustrating an example of vector generating processing in a background art.

Effects of vector generating processing according to the present embodiment will be described below with reference to FIGS. 8 and 9. FIG. 8 is a diagram illustrating an example of vector generating processing in the background art. In the background art, as illustrated in FIG. 8, a corpus model is generated from an integrated corpus obtained by combining two corpuses A and B.

On this occasion, for example, when there is a bias in size of the two corpuses, the features included in either one of the corpuses may be lost without being reflected in the corpus model. In this case, the features of each corpus are not always reflected in a word vector obtained by inputting the input word into the corpus model. As a result, even in an answer obtained by inputting the word vector into a learning model, the features of the corpuses may be lost.

Figure 9:
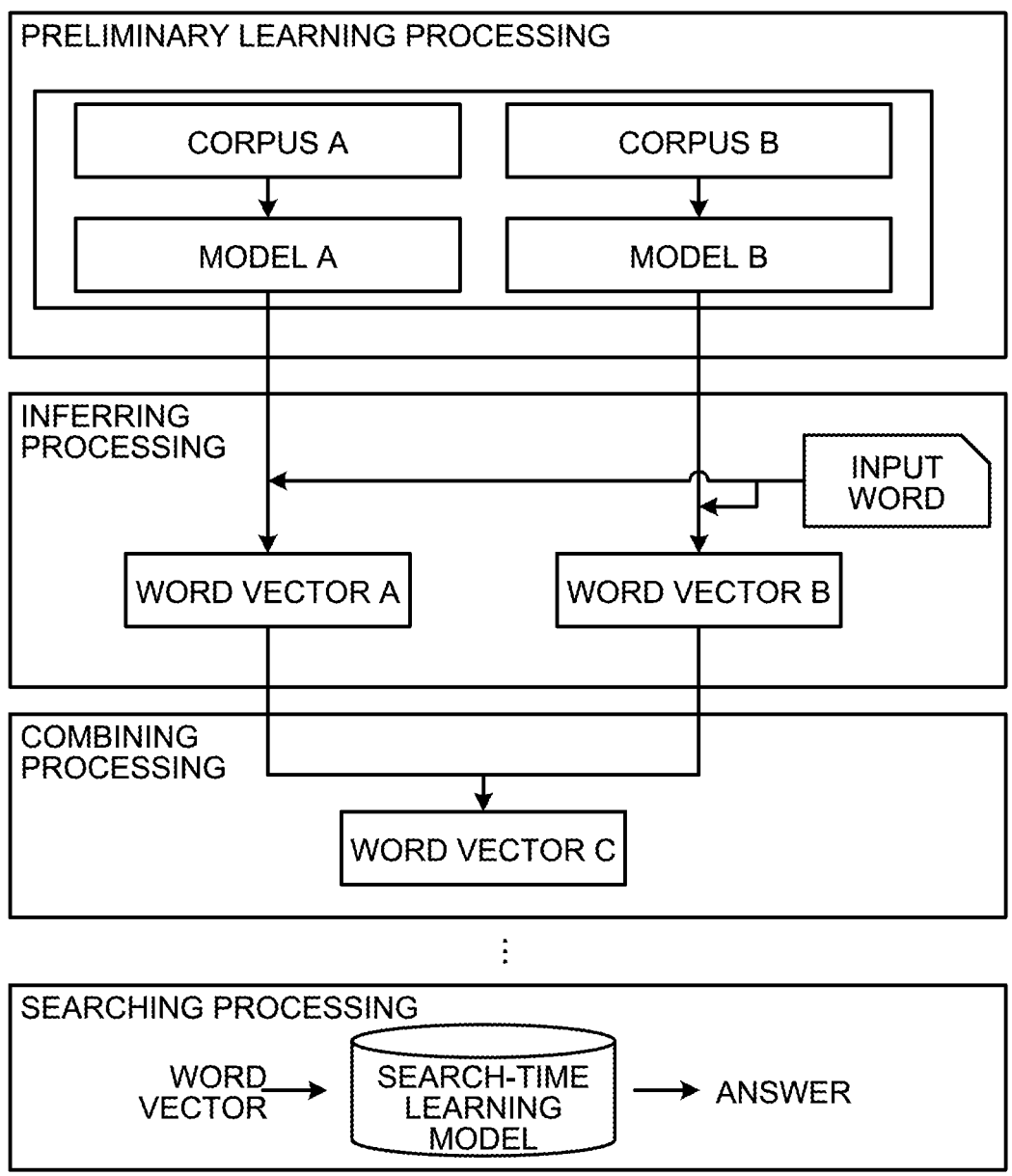
FIG. 9 is a diagram illustrating an example of vector generating processing according to the first embodiment.

On the other hand, in the first embodiment, as illustrated in FIG. 9, instead of combining the corpuses themselves, word vectors obtained from the corpus models A and B generated from the corpuses A and B are combined. FIG. 9 is a diagram illustrating an example of the vector generating processing according to the first embodiment. As illustrated in FIG. 9, in the searching processing according to the first embodiment, the word vector C as illustrated in FIG. 6, in which the features of the word vectors A and B remain, is used. Since the word vectors A and B retain the features of the corpuses A and B, respectively, the features of each corpus can also be reflected in an answer obtained by inputting the word vector C into a learning model.

The generating program may also cause a computer to execute processing for connecting the generated first and second vectors to generate the third vector. As a result, elements included in each vector can be retained unchanged.

The generating program may cause a computer to execute processing for receiving text data including a plurality of words, generating the first and the second vectors according to the text data, and generating a new third vector according to the text data. In other words, a sequence of word features may be plural or singular. This makes it possible to make searching using sentences in natural languages such as question sentences instead of words. Instead of sequentially inputting each word vector generated from each word included in the text data into the neural network, a method for inputting one piece of input data obtained by combining each word vector into the neural network may be adopted.

[b] Second Embodiment

In generating a word vector, an input word is not always included in any of corpuses, that is, the input word is not always registered in a corpus model generated from a corpus. Thus, in a second embodiment, a configuration for generating a combined word vector indicating that there is an input word unregistered in any of corpuses will be described. An input word that is not registered in any of corpuses may be represented as an "unknown word" below.

Figure 10:
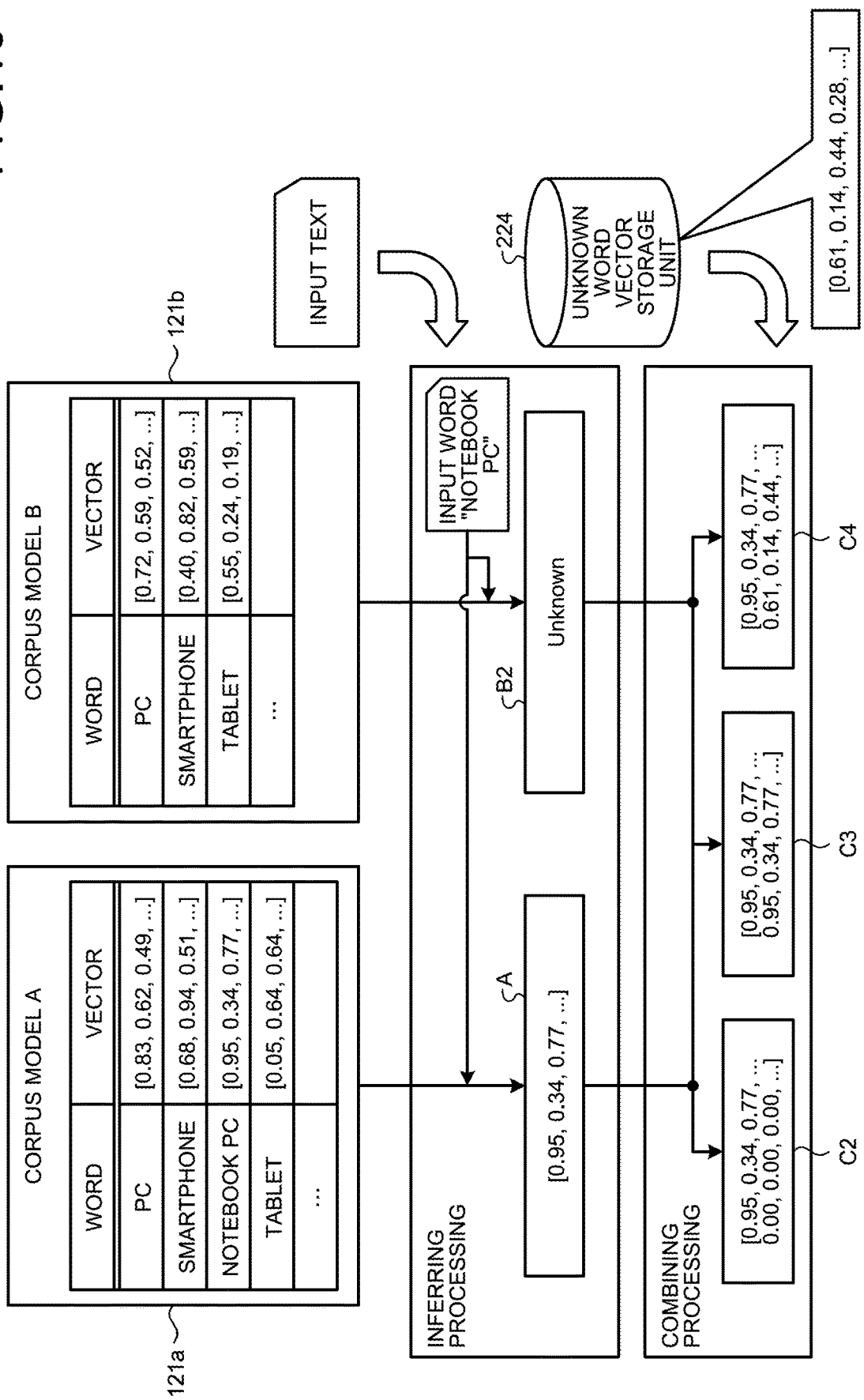
FIG. 10 is a diagram illustrating an example of vector generating processing according to a second embodiment.

A generating program according to the second embodiment combines a word vector indicating that the input word is an unknown word with a word vector corresponding to the other corpus including the unknown word. FIG. 10 is a diagram illustrating an example of vector generating processing in the second embodiment. As illustrated in FIG. 10, in the corpus model B 121b, a word "notebook PC" included in the corpus model A 121a is not registered.

In this case, when an input word is "notebook PC", the generating program refers to the corpus model A 121a and causes a computer to execute processing for extracting the word vector A. On the other hand, since "notebook PC" is not registered in the corpus model B 121b, the generating program is unable to execute processing for extracting the word vector B.

In this case, the generating program generates a word vector B2 indicating that the input word is an unknown word and causes a computer to execute processing for combining with the word vector A.

For example, the generating program causes a computer to execute processing for generating a vector C2 obtained by connecting a vector in which all elements are zero to the word vector A. The generating program may also cause a computer to execute processing for duplicating the word vector A to generate a vector C3 connected to the word vector A. Furthermore, the generating program may cause a computer to execute processing for generating a vector C4 obtained by connecting an unknown word vector prestored in an unknown word vector storage unit 224 described later to the word vector A.

Function Block

Figure 11:
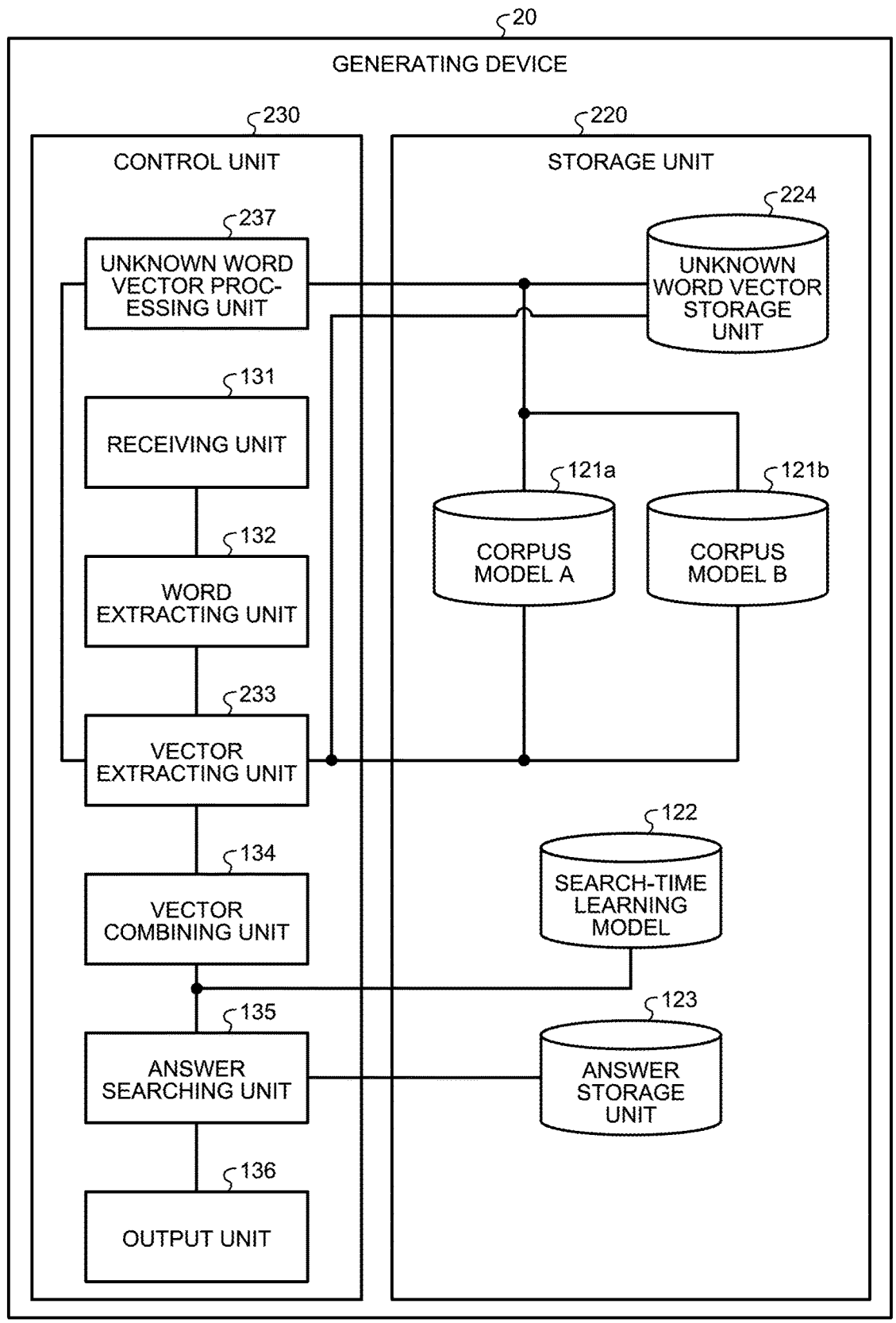
FIG. 11 is a diagram illustrating an example of a generating device according to the second embodiment.

Next, a generating device that executes the generating program will be described with reference to FIG. 11. FIG. 11 is a diagram illustrating an example of the generating device according to the second embodiment. In the following embodiments, identical reference numbers are given to sections identical to those illustrated in the drawings described above, and redundant descriptions will be omitted.

As illustrated in FIG. 11, a generating device 20 according to the present embodiment includes a storage unit 220 and a control unit 230. The storage unit 220 is an example of a storage device that stores programs and data and is, for example, a memory or a processor. This storage unit 220 stores the unknown word vector storage unit 224 in addition to the corpus model A 121a and the corpus model B 121b, the search-time learning model 122, and the answer storage unit 123.

The unknown word vector storage unit 224 stores an unknown word vector indicating that an input word is an unknown word. In the second embodiment, an unknown word vector is, for example, a random number vector but may be a vector generated by learning the corpus models A and B as will be described later. Information stored in the unknown word vector storage unit 224 is input in advance by an administrator (not illustrated) of the generating device 20, or input by an unknown word vector processing unit 237 described later.

The control unit 230 is a processing unit that controls the entire generating device 20 and is a processor, for example. The control unit 230 further includes a vector extracting unit 233 and the unknown word vector processing unit 237 in addition to the receiving unit 131, the word extracting unit 132, the vector combining unit 134, the answer searching unit 135, and the output unit 136. The vector extracting unit 233 and the unknown word vector processing unit 237 are also an example of an electronic circuit included in a processor and an example of a process executed by a processor.

As with the vector extracting unit 133, the vector extracting unit 233 extracts a plurality of word vectors corresponding to word groups into which the input word is segmented, for each corpus model, to output to the vector combining unit 134. In doing so, the vector extracting unit 233 determines whether the input word is registered in each corpus model.

When determining that the input word is not registered in the corpus models, the vector extracting unit 233 outputs an unknown word vector obtaining request to the unknown word vector processing unit 237. Then, the vector extracting unit 233 outputs the obtained unknown word vector to the vector combining unit 134 as a word vector corresponding to the corpus model.

Upon receipt of the unknown word vector obtaining request from the vector extracting unit 233, the unknown word vector processing unit 237 outputs an unknown word vector to the vector extracting unit 233. As illustrated in FIG. 10, the unknown word vector processing unit 237 outputs, for example, a vector in which all elements are zero as an unknown word vector.

In addition, the unknown word vector processing unit 237 may, for example, receive a request for obtaining an unknown word vector including an extracted word vector from the vector extracting unit 233 and output the extracted word vector included in the obtaining request as an unknown word vector. Furthermore, the unknown word vector processing unit 237 may, for example, obtain an unknown word vector stored in the unknown word vector storage unit 224 to output to the vector extracting unit 233.

Flow of Processing

Figure 12:
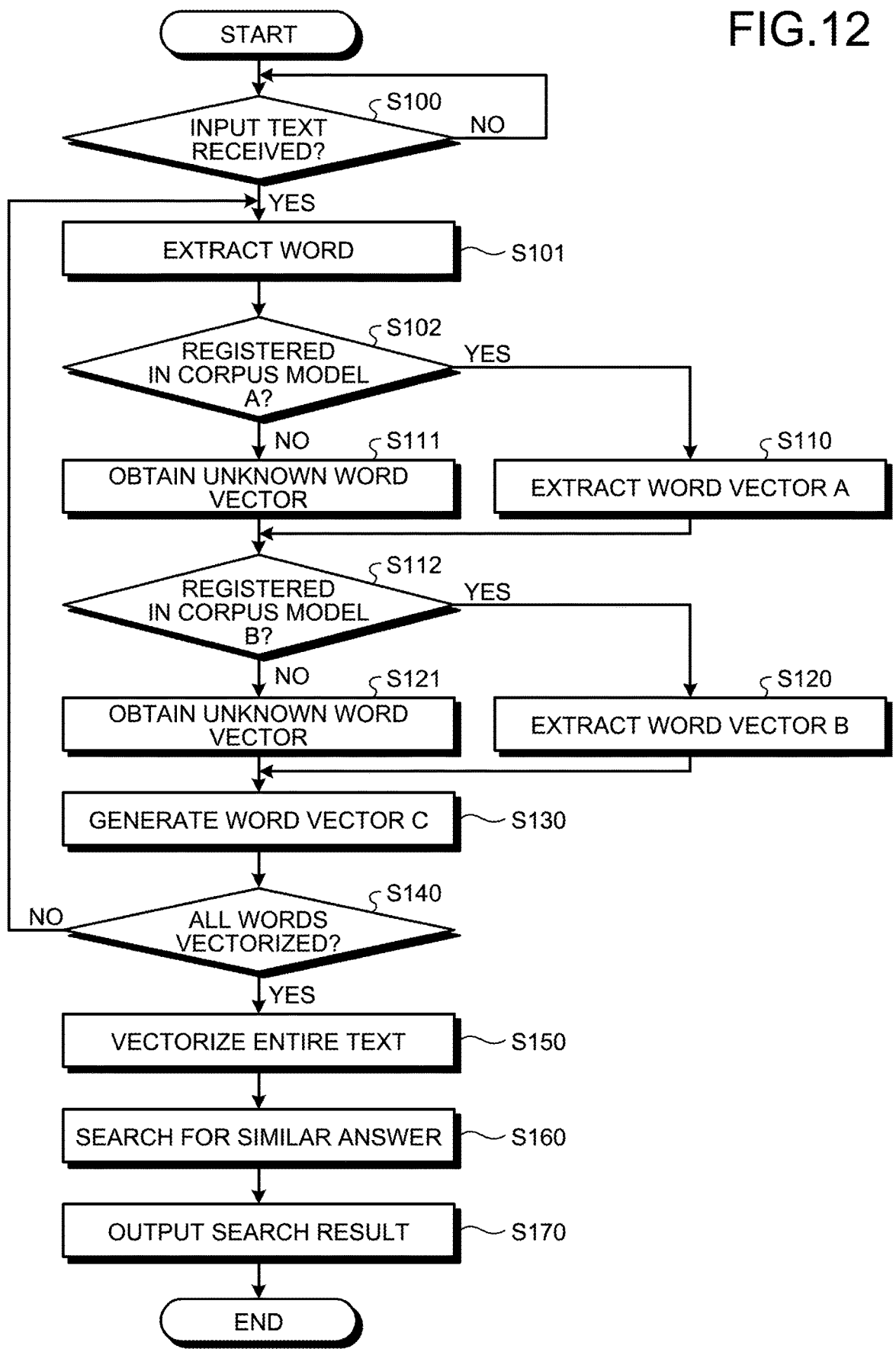
FIG. 12 is a flowchart illustrating an example of answer extracting processing in the second embodiment.

Next, processing in the present embodiment will be described with reference to FIG. 12. FIG. 12 is a flowchart illustrating an example of answer extracting processing according to the second embodiment. In the following description, reference numbers identical to those in steps illustrated in FIG. 7 are similar steps, and therefore, detailed description will be omitted.

As illustrated in FIG. 12, the vector extracting unit 233 in the generating device 20 determines whether a word has been registered in the corpus model A 121a (S102). When determining that the word has been registered in the corpus model A 121a (S102: Yes), the vector extracting unit 233 extracts the word vector A (S110), and processing proceeds to S112.

On the other hand, when determining that the word has not been registered in the corpus model A 121a (S102: No), the vector extracting unit 233 outputs an unknown word vector obtaining request to the unknown word vector processing unit 237.

Upon receipt of the output of the unknown word vector obtaining request, the unknown word vector processing unit 237 outputs an unknown word vector to the vector extracting unit 233 (S111), and processing proceeds to S112.

Similarly, the vector extracting unit 233 determines whether the word has been registered in the corpus model B 121b (S112). When determining that the word has been registered in the corpus model B 121b (S112: Yes), the vector extracting unit 233 extracts the word vector B (S120), and processing proceeds to S130.

On the other hand, when determining that the word has not been registered in the corpus model B 121b (S112: No), the vector extracting unit 233 outputs an unknown word vector obtaining request to the unknown word vector processing unit 237.

Upon receipt of the output of the unknown word vector obtaining request, the unknown word vector processing unit 237 outputs an unknown word vector to the vector extracting unit 233 (S121), and processing proceeds to S130.

Effects

As described above, when determining that the word is an unknown word not included in the first or the second conversion parameter, the generating program according to the second embodiment causes a computer to execute processing for generating a vector indicating that the word is an unknown word. This makes it possible to generate a combined word vector indicating that the input word is an unknown word.

The generating program may cause a computer to execute processing for generating a zero-vector or a random number vector as a vector indicating that the input word is an unknown word. Further, the generating program may cause a computer to execute processing for generating a vector obtained by duplicating the first or the second vector which is not determined to be an unknown word as a vector indicating that the word is an unknown word. As a result, an unknown word vector can be generated in an arbitrary form.

The unknown word vector processing unit 237 may generate an unknown word vector by learning the corpus models A and B instead of a random number vector as an unknown word vector.

Figure 13:
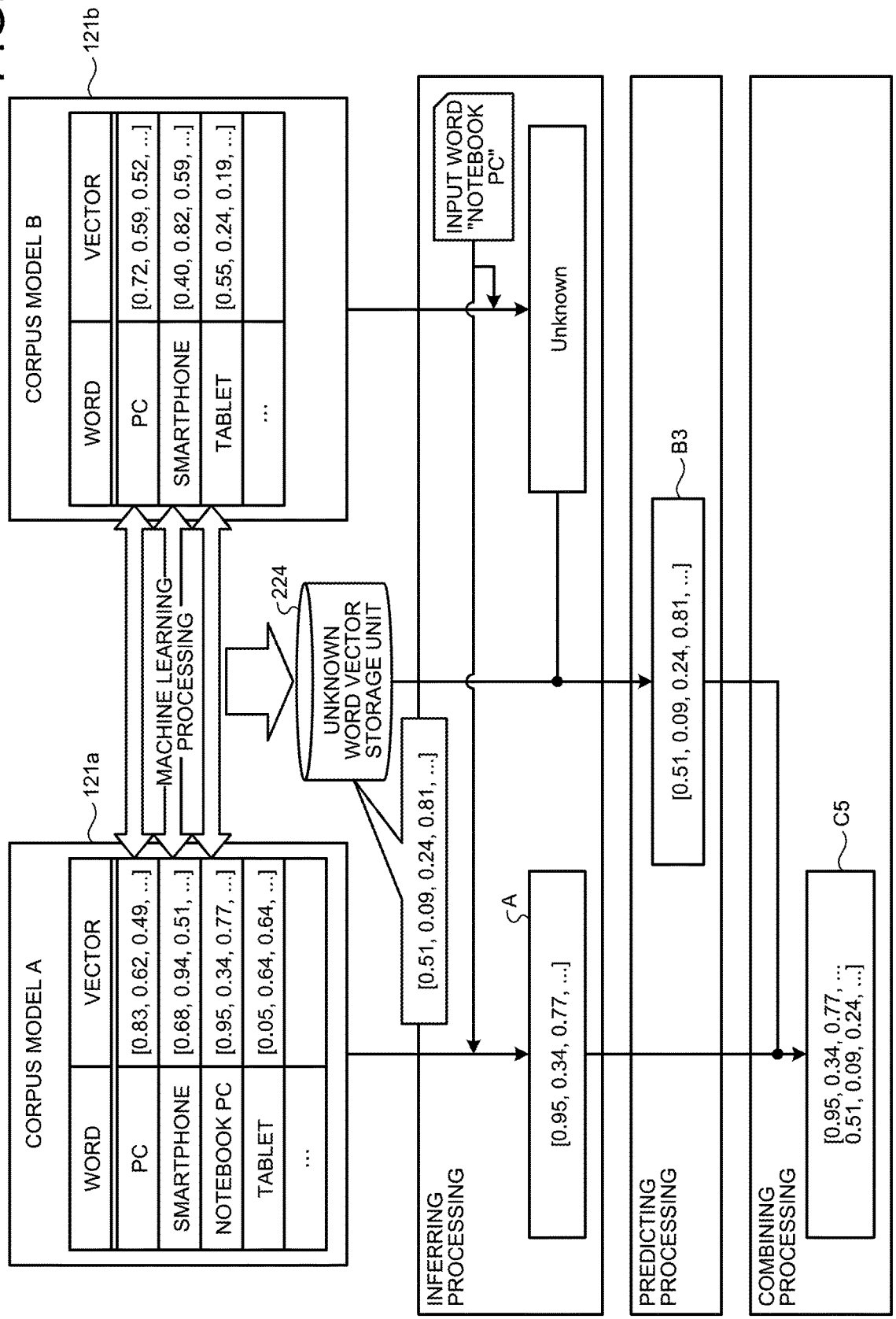
FIG. 13 is a diagram illustrating another example of vector generating processing according to the second embodiment.

FIG. 13 is a diagram illustrating another example of the vector generating processing according to the second embodiment. As illustrated in FIG. 13, the unknown word vector processing unit 237 generates an unknown word vector B3 by learning using word vectors of each word such as "PC", "smartphone", and "tablet" commonly included in the corpus models A and B.

Thus, the generating program according to the second embodiment may cause a computer to execute processing for generating a vector indicating that the word is an unknown word through learning processing using a combination of the first and the second vectors. This makes it possible to generate an unknown word vector corresponding to the features of each corpus.

[c] Third Embodiment

Embodiments of the present invention have been described above, but the present invention may be implemented in other various different forms than the embodiments described above. Thus, a different embodiment will be described below.

For example, the configuration where the vector combining unit 134 connects the word vectors A and B has been described, but the present invention is not limited thereto, and the word vectors A and B may be computed.

Figure 14:
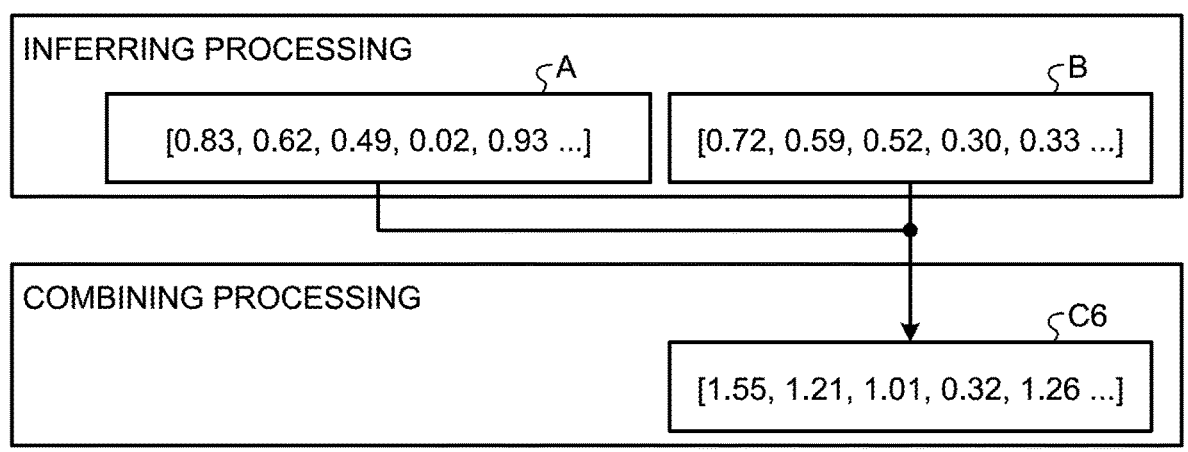
FIG. 14 is a diagram illustrating an example of vector combining processing according to a third embodiment.

FIG. 14 is a diagram illustrating an example of vector combining processing according to a third embodiment. As illustrated in FIG. 14, a vector combining unit 334 (not illustrated) according to the third embodiment generates a combined word vector C6 by adding the word vectors A and B.

Thus, the generating program may cause a computer to execute processing for generating the third vector by computing the generated first and second vectors. This makes it possible to combine a plurality of word vectors without increasing dimensions of the word vectors before combination.

Further, the configuration where the vector combining unit 134 connects the word vectors A and B in an identical dimension has been described, but the present invention is not limited thereto, and the word vectors A and B may have different dimensions.

Figure 15:
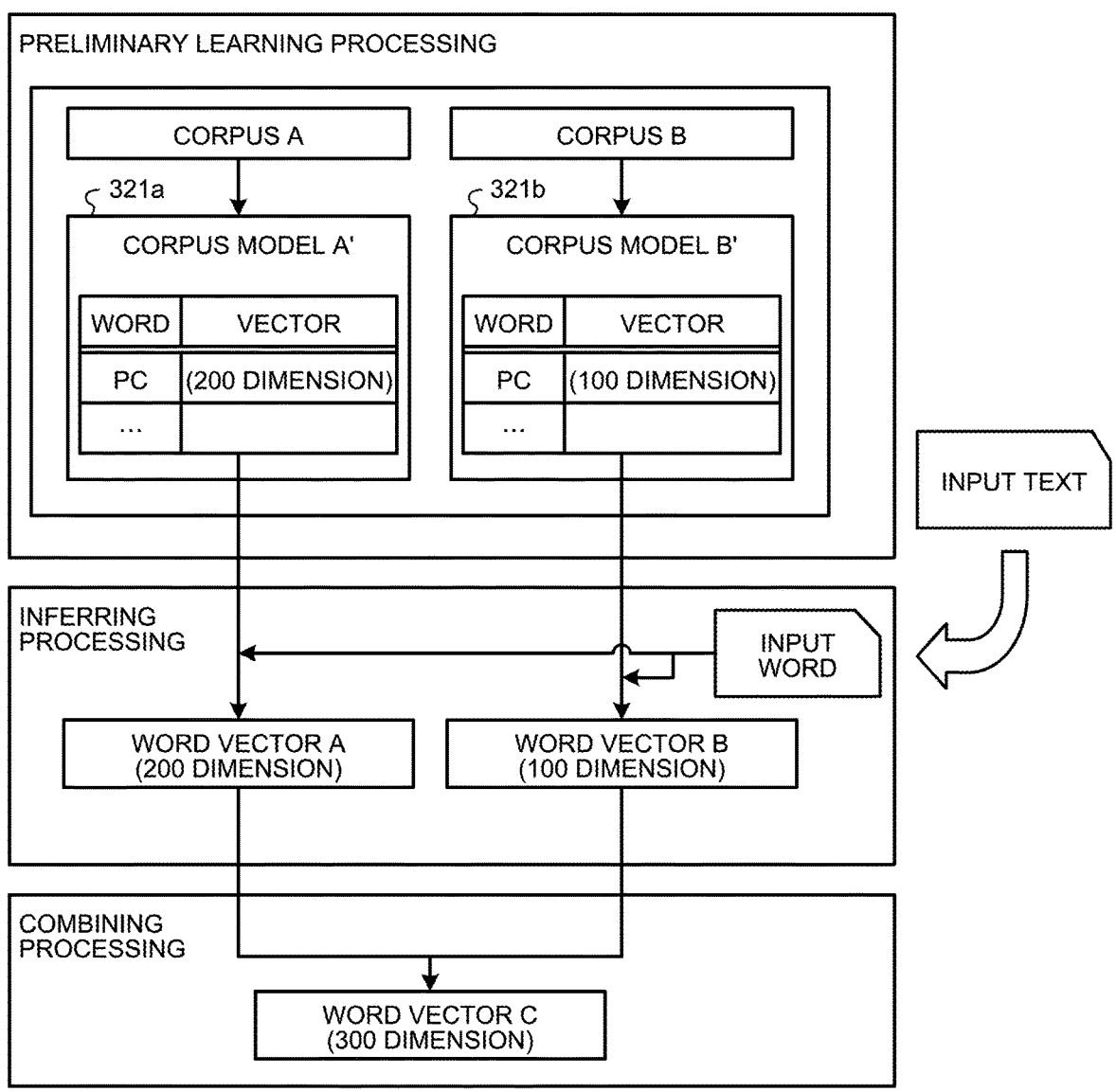
FIG. 15 is a diagram illustrating an example of vector generating processing according to the third embodiment.

FIG. 15 is a diagram illustrating an example of vector generating processing in the third embodiment. As illustrated in FIG. 15, a corpus model A' 321a according to the third embodiment stores a 200-dimensional word vector. On the other hand, a corpus model B' 321b according to the third embodiment stores a 100-dimensional word vector. In this case, a vector extracting unit 333 (not illustrated) may extract a 200-dimensional word vector A and a 100-dimensional word vector B, respectively. The vector combining unit 334 (not illustrated) may generate a 300-dimensional word vector C by combining the 200-dimensional word vector A and the 100-dimensional word vector B.

Thus, the generating program may cause a computer to execute processing for generating the second vector different from the first vector in dimension. This can change weighting of each word vector corresponding to each corpus model.

In addition, the configuration using the corpus models A and B generated from two corpuses has been described, but the number of corpus models is not limited thereto, and three or more corpus models may be used.

Figure 16:
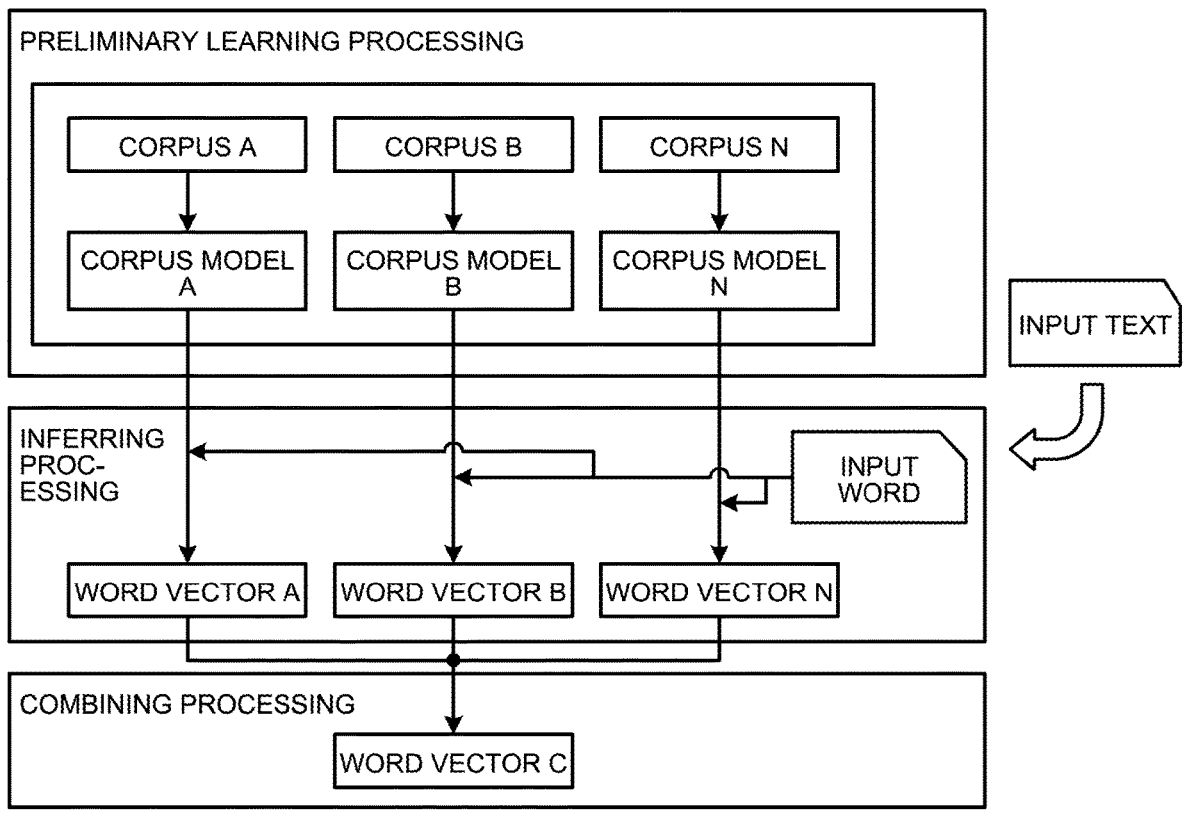
FIG. 16 is a diagram illustrating another example of vector generating processing according to the third embodiment.

FIG. 16 is a diagram illustrating another example of the vector generating processing according to the third embodiment. As illustrated in FIG. 16, in the third embodiment, a corpus model N generated from a corpus N is further used, in addition to the corpus models A and B generated from the corpuses A and B, respectively, as in the example illustrated in FIG. 10. In this case, the vector extracting unit 333 (not illustrated) may further extract a word vector N using the corpus model N in addition to the word vectors A and B. Further, the vector combining unit 334 (not illustrated) may further combine the word vector N in addition to the word vectors A and B to generate the word vector C.

Thus, the generating program may cause a computer to execute processing for further applying a third conversion parameter to the word to further generate a fourth vector according to the word. The generating program may also cause a computer to execute processing for generating a new third vector according to the word based on the fourth vector in addition to the first and the second vectors. This makes it possible to use a word vector that retains the features of three or more corpuses.

Meanwhile, when vectors are combined, the dimension of a combined vector increases, and it may take time for searching processing. Thus, any one of the first, the second, and the third vectors or a combination of two or more thereof may be selected. In this case, by using a learning model corresponding to a selected vector, determination results of the received word and a plurality of sentences to be determined may be obtained. This makes it possible to adopt a vector in a size appropriate for a processing load.

The embodiment is not limited to distributed learning intended for documents in Japanese, but documents in other languages such as English and Chinese may be used.

Neural Network

For preliminary learning processing, any arbitrary neural networks such as recurrent neural network (RNN) and convolutional neural network (CNN) can be used. As a learning method, various publicly known methods such as an error back propagation (BP) method can be adopted. A neural network has a multistage configuration including, for example, an input layer, an intermediate layer (hidden layer), and an output layer, and each layer has a structure in which a plurality of nodes is connected by edges. Each layer has a function called "activation function", and an edge has "weight". A value of each node is calculated from a value of a node of a previous layer, a value of a weight of a connection edge, and an activation function of the layer. As for a calculation method, various publicly known methods can be adopted.

System

Besides, processing procedures, controlling procedures, specific names, and information including various types of data and parameters illustrated in the text and the drawings can be arbitrarily changed unless otherwise specified.

In addition, each component of each device illustrated in the drawings is functionally conceptual and does not necessarily have to be physically configured as illustrated. In brief, specific forms of distribution and integration of each device are not limited to those illustrated in the drawings. In other words, all or a part of the devices can be functionally or physically distributed/integrated in an arbitrary unit according to various loads and usage situations. For example, the vector extracting unit 233 and the unknown word vector processing unit 237 illustrated in FIG. 11 may be integrated. Further, the answer searching unit 135 illustrated in FIG. 2 may be realized by a computer different from the generating device 10. This means that the inferring processing and the combining processing may be executed in different housings. Furthermore, all or an arbitrary part of each processing function executed at each device can be realized by a CPU and a program analyzed on the CPU or can be realized as hardware by a wired logic.

Hardware Configuration

Figure 17:
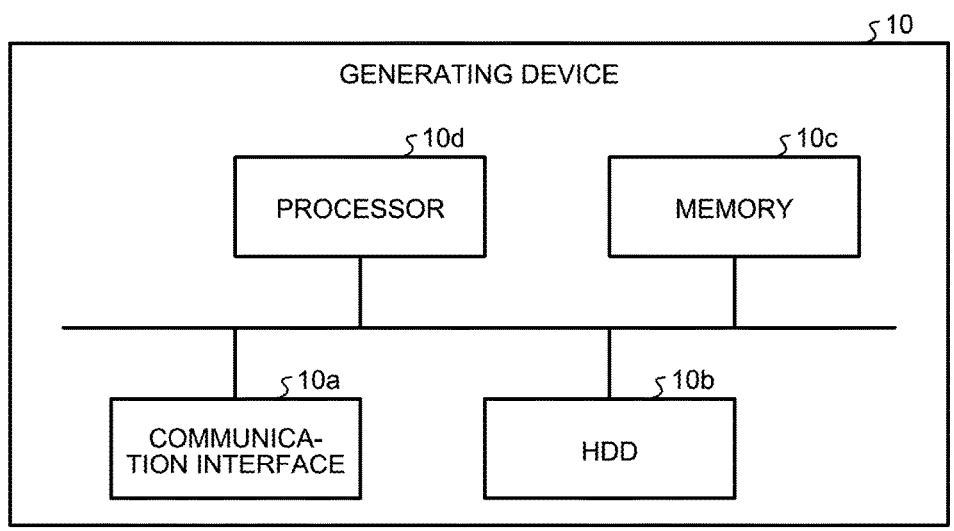
FIG. 17 is a diagram illustrating an example of a hardware configuration.

FIG. 17 is a diagram illustrating an example of a hardware configuration. As illustrated in FIG. 17, the generating device 10 includes a communication interface 10a, a hard disk drive (HDD) 10b, a memory 10c, and a processor 10d. In the following description, the generating device 10 according to the first embodiment will be described, but the generating devices according to other embodiments can also be realized with similar configurations.

The communication interface 10a is a network interface card or the like that controls communications of other devices. The HDD 10b is an example of a storage device that stores programs, data, and the like.

An example of the memory 10c is a random access memory (RAM) such as a synchronous dynamic random access memory (SDRAM), a read only memory (ROM), a flash memory, or the like. An example of the processor 10d is a central processing unit (CPU), a digital signal processor (DSP), a field programmable gate array (FPGA), a programmable logic device (PLD), or the like.

Further, the generating device 10 functions as an information processing device that executes a learning method by reading and executing programs. In other words, the generating device 10 executes a program that carries out functions similar to those of the receiving unit 131, the word extracting unit 132, the vector extracting unit 133, the vector combining unit 134, the answer searching unit 135, and the output unit 136. As a result, the generating device 10 can execute processes that carry out functions similar to those of the receiving unit 131, the word extracting unit 132, the vector extracting unit 133, the vector combining unit 134, the answer searching unit 135, and the output unit 136. Programs in other embodiments are not limited to being executed by the generating device 10. For example, the present invention can equally be applied even in a case where other computers or servers execute programs or in a case where they cooperate to execute programs.

According to one aspect, features included in a conversion parameter can be retained.

All examples and conditional language recited herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium storing therein a generating program that causes a computer to execute a process comprising:

receiving a word;

generating a first and a second vectors according to the received word by applying a first and a second corpus models each to the received word, each of a first corpus and a second corpus being a collection of a plurality of sentences, each of the first and the second corpus models being generated by segmenting sentence groups included in each of the first and the second corpus into words through a morphological analysis and learning word vectors of words in the segmented word groups, a word vector of the learning word vectors with a plurality of dimensions having components of word feature elements represented by quantified continuous values; and generating a new third vector according to the received word based on the generated first and second vectors, wherein in the process for generating the first and the second vectors, when determining that the received word is an unknown word not included in the first or the second corpus model, a vector indicating that the received word is the unknown word is generated.

2. The non-transitory computer-readable recording medium according to claim 1, wherein in the process for generating the third vector, the generated first and second vectors are connected to generate the third vector.

3. The non-transitory computer-readable recording medium according to claim 1, wherein in the process for generating the third vector, the third vector is generated by computing the generated first and second vectors.

4. The non-transitory computer-readable recording medium according to claim 1, wherein in the process for generating the first and the second vectors, the second vector different from the first vector in dimension is generated.

5. The non-transitory computer-readable recording medium according to claim 1, wherein in the process for generating the first and the second vectors, a zero-vector or a random number vector is generated as a vector indicating that the received word is the unknown word.

6. The non-transitory computer-readable recording medium according to claim 1, wherein in the process for generating the first and the second vectors, a vector obtained by duplicating the first or the second vector that is not determined to be an unknown word is generated as a vector indicating that the received word is the unknown word.

7. The non-transitory computer-readable recording medium according to claim 1, the process further including generating a vector indicating that the received word is the unknown word through learning processing using a combination of the first and the second vectors.

8. The non-transitory computer-readable recording medium according to claim 1, the process further including obtaining, by using a learning model that has performed learning on features of words or phrases included in a plurality of sentences to be determined, determination results of the received word and the sentences to be determined from the third vector.

9. The non-transitory computer-readable recording medium according to claim 8, wherein in the process for obtaining the determination results, any one of or a combination of two or more of the first, the second, and the third vectors is selected to obtain determination results of the received word and the sentences to be determined using the learning model corresponding to a selected vector.

10. The non-transitory computer-readable recording medium according to claim 1, wherein
in the process for receiving, text data including a plurality of words are received,
in the process for generating the first and the second vectors, the first and the second vectors according to the text data are generated, and
in the process for generating the third vector, a new third vector according to the text data is generated.

11. The non-transitory computer-readable recording medium according to claim 1, wherein
in the process for generating the first and the second vectors, a third corpus model generated from a third corpus is further applied to the received word to further generate a fourth vector according to the received word, and in the process for generating the third vector, a new third vector according to the received word is generated based on the fourth vector in addition to the generated first and second vectors.

12. A generating method comprising:
receiving a word;
generating a first and a second vectors according to the received word by applying a first and a second corpus models each to the received word, by a processor, each of a first corpus and a second corpus being a collection of a plurality of sentences, each of the first and the second corpus models being generated by segmenting sentence groups included in each of the first and the second corpus into words through a morphological analysis and learning word vectors of words in the segmented word groups, a word vector of the learning word vectors with a plurality of dimensions having components of word feature elements represented by quantified continuous values; and
generating a new third vector according to the received word based on the generated first and second vectors, wherein in the process for generating the first and the second vectors, when determining that the received word is an unknown word not included in the first or the second corpus model, a vector indicating that the received word is the unknown word is generated.

13. A generating device comprising:
a processor configured to:
receive a word;
generate a first and a second vectors according to the received word by applying a first and a second corpus models each to the received word to, each of a first corpus and a second corpus being a collection of a plurality of sentences, each of the first and the second corpus models being generated by segmenting sentence groups included in each of the first and the second corpus into words through a morphological analysis and learning word vectors of words in the segmented word groups, a word vector of the learning word vectors with a plurality of dimensions having components of word feature elements represented by quantified continuous values; and
generate a new third vector according to the received word based on the generated first and second vectors, wherein the processor configures to generate the first and the second vectors, when determining that the received word is an unknown word not included in the first or the second corpus model, a vector indicating that the received word is the unknown word is generated.

* * * * *